March 9, 1943.   A. H. ERICKSON   2,313,327
HOLDER FOR WELDING RODS
Filed Jan. 18, 1941

INVENTOR.
AARON H. ERICKSON
BY James M. Heilman
ATTORNEYS.

Patented Mar. 9, 1943

2,313,327

UNITED STATES PATENT OFFICE 2,313,327

HOLDER FOR WELDING RODS

Aaron Henry Erickson, West Lancaster, Pa., assignor to Lancaster Iron Works, Inc., Lancaster, Pa.

Application January 18, 1941, Serial No. 374,965

6 Claims. (Cl. 219—8)

One of the objects of this invention is to provide a holder which will securely grasp an article in any desired direction with respect to the holder. More specifically, the invention is concerned with, although not limited to, a holder for electric welding rods.

Another object is to provide a holder comprising an upper and a lower jaw which contacts and clamps the entire length of the object placed within the area of the jaws.

A further object of this invention is to provide a holder, the upper jaw of which holder is adapted to move on a universal pivot so that the face of the upper jaw will move not only in a direction face to face with the lower jaw, but also in a direction tilted and sideway to the face of the lower jaw.

A still further object of this invention is to provide a holder for electric welding rods which will provide a long contacting area rather than a point contact between the holder and the welding rod.

Other and further objects will be apparent from a reading of the following:

Figures 1, 2, 3:
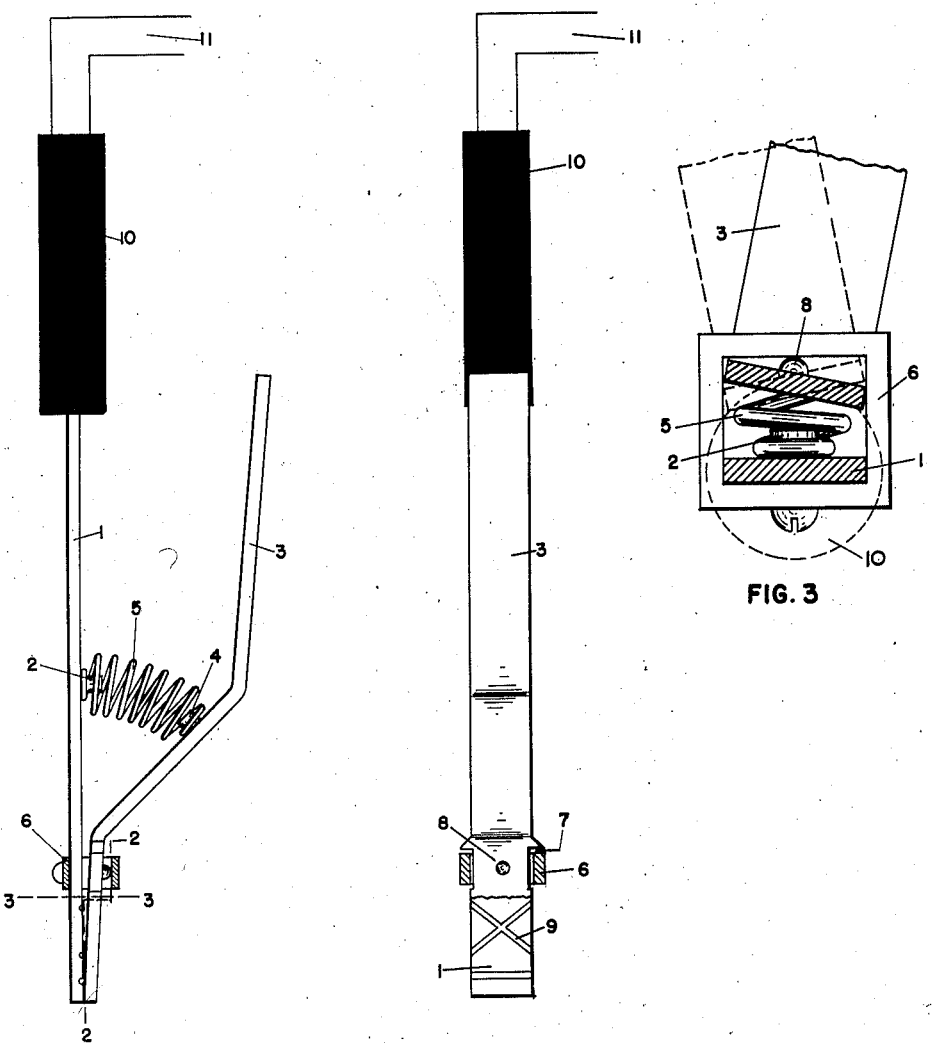
Fig. 1 is a side view of the holder.
Fig. 2 is a section of the holder taken on the line 2—2 of Fig. 1.
Fig. 3 is a view taken on the line 3—3 of Fig. 1 and showing a portion of the handle. The movement of the upper arm of the holder is shown by solid and dotted lines.

Prior to applicant's invention holders for objects had a pin through the upper jaw which permitted only straight line movement of the upper jaw in a direction toward and away from the lower jaw. In other words, no tilting of the upper jaw in a transverse direction was possible so that across any transverse portion of the upper jaw, both the right hand and left hand face of the jaw would be the same distance from the cooperating portion of the lower jaw.

Applicant's invention does away with this rigid construction and accomplishes some very important results.

Also in electrical work, such as welding, the holder is adapted to hold a welding rod and provides a device which not only securely holds the welding rod in the desired position, but also furnishes an area of contact throughout the area of the welding rod between the jaws. This connection reduces the resistance of the circuit while in operation and, more important, eliminates or greatly reduces arcing and sparking, and thus, increases the life of the welding rod and the holder.

The device comprises a bar 1 having a projection 2, an upper bar 3 having a projection 4 and a spring 5 positioned around the projections 2 and 4 to keep the forward ends or jaws of the bars 1 and 3 closed.

A strap 6 is secured to bar 1 near its forward end by means of a bolt or by some other means. The upper bar 3 is notched or grooved as shown at 7 so that it will ride in the rails or passageway provided by the vertical sides of strap 6. The upper side of the upper bar is provided with a rounded projection 8 which is forced by spring 5 to abut against the upper portion of the strap. This special connection including projection 8 permits the upper jaw to move not only in an oscillatory direction but also in a tilting direction and produces the advantages set forth in this specification.

The upper face or contacting face of the lower bar is provided with shallow grooves 9 to provide some sort of a holding area. These grooves help to a limited extent to keep the welding rod or other object in a certain position, but their use is only temporary and not very effective. After a short time, these grooves become filled with corrosion caused by electrical arcing and other dirt.

Insulation surrounding the lower bar is indicated by numeral 10 and the electrical lead line to the lower bar is indicated by numeral 11.

In operation insulation 10 is securely gripped by the fingers of the hand and the thumb serves to operate upper bar 3 to open the jaws for insertion or withdrawal of the rod.

If the object to be held is placed at exactly right angles to the holder the object will be held throughout the entire area which is placed between the jaws. Also, if an article, other than an article which has exactly the same taper as the open jaws of the holder, is placed between the jaws of the holder only the point which is closest to the pivot point of the holder will be held and the remainder of the object which is being held will not be contacted by the jaws.

The invention has been described particularly in connection with the holding of welding rods. However, I do not wish to be limited to welding accessories, nor to be limited to electrical appurtenances. This device can be used effectively to hold innumerable types of hot objects where more than a point contact is desired. With this thought in mind I desire to be limited only by the broadest possible scope of my claims.

What I claim is:

1. In a holder comprising a stationary lower bar, a relatively movable upper bar, a pivot strap fixedly secured to said lower bar and movably supporting said upper bar, spring means tending to keep the forward ends of said bars together and an integral rounded projection on said upper bar contacting said pivot strap so that said upper bar may move in all directions and thereby exert a large clamping area.

2. A strap, a bar secured to said strap, and a second bar movably associated with said strap, said second bar having a rounded projection thereon contacting said strap whereby a universal movement is obtained, and means for biasing said bars together at their outer ends.

3. In a holder comprising a stationary lower bar, a relatively movable upper bar, a pivot strap fixedly secured to said lower bar and movably supporting said upper bar, means tending to keep the forward ends of said bars together and means associated with said upper bar whereby said upper bar may move in a plurality of directions.

4. A holder comprising a lower bar, an upper bar, a strap positioning said bars, tension means urging one end of said bars together, a projection on said upper bar contacting said strap so that movement of the upper bar in a multitude of directions may be obtained.

5. In a holder for welding rods comprising a strap, two bars associated with said strap and adapted to clamp a welding rod therebetween, and means for biasing said bars together at their outer ends, one of said bars being connected to a source of electrical energy to provide a conductor for electrical energy, the other of said bars being provided with a multi-movement connection bearing against said strap to securely contact a welding rod throughout all of its length positioned within the area of the bars.

6. In a holder for welding rods comprising two bars adapted to clamp a welding rod therebetween, one of said bars having grooves therein and being connected to a source of electrical energy to provide a conductor for the same, a securing element rigidly fastened to one of said bars, the other bar having a projection thereon which contacts said securing element, said other bar being notched intermediate its ends so as to ride within the confine of the securing element, and tension means serving to force the end of said bars together to hold a welding rod.

AARON HENRY ERICKSON.